United States Patent [19]

Shimizu et al.

[11] Patent Number: 4,999,131

[45] Date of Patent: Mar. 12, 1991

[54] METHOD AND APPARATUS FOR THE PREPARATION OF A WATER BASED DISPERSION OF A VISCOUS LIQUID

[75] Inventors: Koji Shimizu; Toyohiko Yamadera; Mitsuo Hamada, all of Ichihara, Japan

[73] Assignee: Toray Silicone Company Ltd., Tokyo, Japan

[21] Appl. No.: 307,641

[22] Filed: Feb. 7, 1989

[30] Foreign Application Priority Data

Feb. 10, 1988 [JP] Japan .................................. 63-27665

[51] Int. Cl.[5] .......................... B01J 13/00; B01F 5/06

[52] U.S. Cl. .................................... 252/314; 252/312; 366/168; 366/178

[58] Field of Search ................ 252/312, 314; 137/896; 366/165, 173, 168, 178

[56] References Cited

U.S. PATENT DOCUMENTS 2,075,403 3/1937 Nester ................................ 252/314
3,682,447 8/1972 Zucker et al. ...................... 366/168
3,744,763 7/1973 Schnöring et al. ................. 366/178
3,995,838 12/1976 Zucker ......................... 423/566.1 X
4,113,688 9/1978 Pearson .......................... 210/738 X
4,213,712 7/1980 Aanonsen et al. ................. 366/178
4,756,326 7/1988 Johnston ........................ 137/896 X
4,771,800 9/1988 Pomeroy ............................. 137/13
4,778,280 10/1988 Brazelton ....................... 366/165 X

OTHER PUBLICATIONS

Derwent Abstract, C78-68733A/38.
Derwent Abstract, C76-X18949.
Derwent Abstract, C75-52657W/32.
Derwent Abstract, C76-X30136.

*Primary Examiner*—Richard D. Lovering
*Assistant Examiner*—Daniel S. Metzmaier
*Attorney, Agent, or Firm*—Edward C. Elliott

[57] ABSTRACT

A method and apparatus is provided for the preparation of liquid dispersions comprising the uniform dispersion of a viscous liquid formed of strands, threads or columns, such as a silicone polymer in water.

6 Claims, 2 Drawing Sheets

METHOD AND APPARATUS FOR THE PREPARATION OF A WATER BASED DISPERSION OF A VISCOUS LIQUID

BRIEF SUMMARY OF THE INVENTION

The present invention relates to a method and apparatus for the preparation of liquid dispersions comprising the uniform dispersion in microparticulate form of a viscous liquid, for example, a silicone polymer, and the like, in water.

BACKGROUND OF THE INVENTION

Mechanically forced dispersion methods using colloid mills are known to be effective methods for generating microparticulate emulsified dispersions of viscous liquids, e.g., silicone polymers, and the like, in water. However, several problems arise with such dispersions prepared by forced dispersion in a colloid mill. Thus, while the viscous liquid can in fact be very finely broken up, the resulting particle diameters are widely scattered and a homogeneously dispersed state cannot be obtained. As a consequence, in order to homogenize the particles, it is necessary after colloid mill processing to carry out an additional supplementary treatment using a power device such as an homogenizer, and the like. This then causes a reduction in productivity as well as an increase in costs.

OBJECT OF THE INVENTION

The object of the present invention is to solve the above problems residing in the prior art through the introduction of both a method and an apparatus for the preparation of viscous liquid water-based dispersions with an improved size reduction and an improved particle diameter uniformity based on the planned manipulation of the form of the viscous liquid prior to processing in the colloid mill.

DETAILED DESCRIPTION OF THE INVENTION

Figure 1:
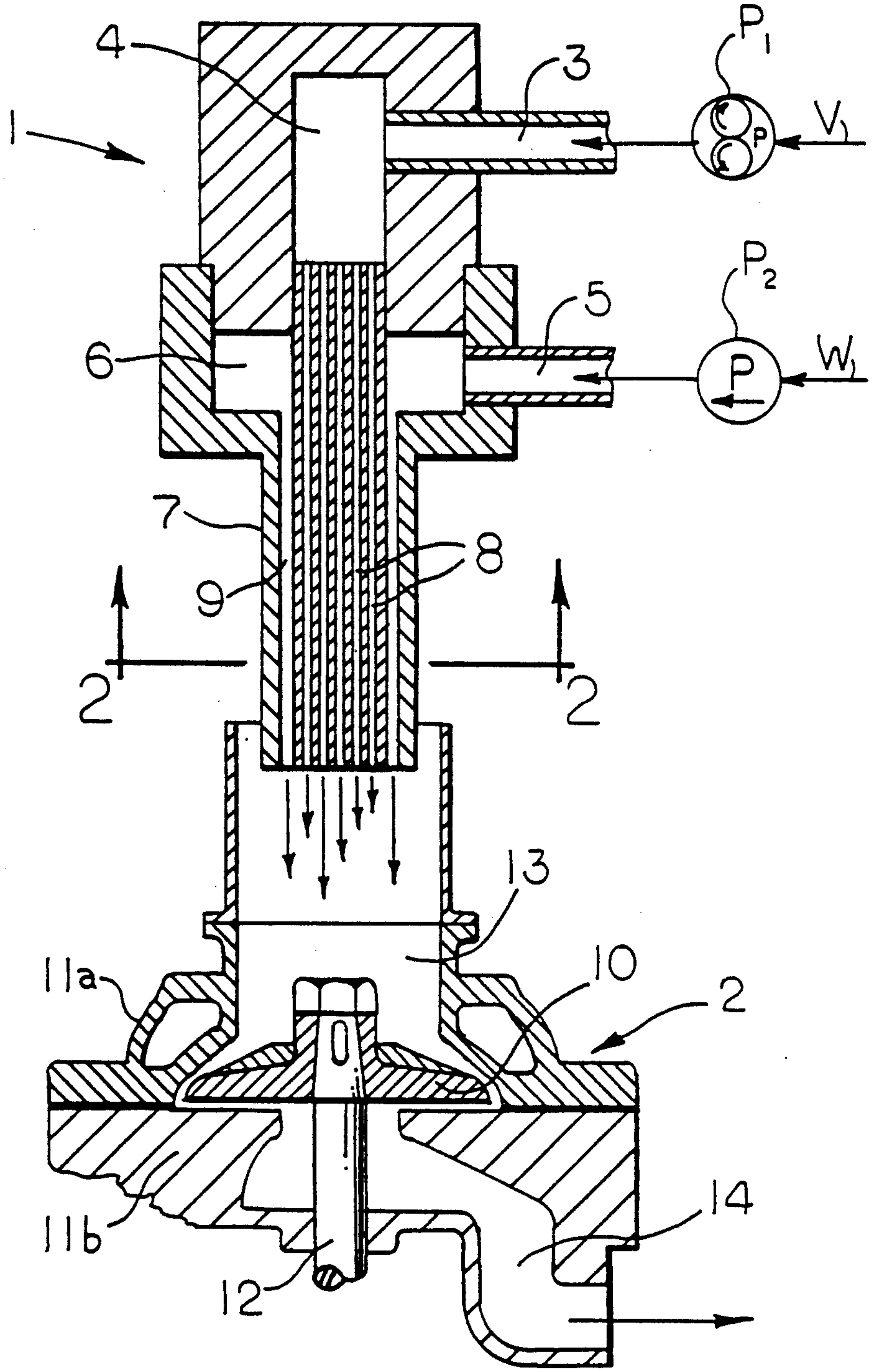
FIG. 1 is a vertical schematic cross section which presents one example of an apparatus for executing the present invention.

The aforesaid object is achieved by the present invention's method for the preparation of water-based dispersions of viscous liquids. Said method has the characteristic that, together with water, the viscous liquid is fed into the colloid mill by forced discharge and downflow in the form of a plural number of threads or strands from a plural number of small holes, or orifices, said water is forcibly discharged as a film which flows down in such a manner that it encircles the circumference of the viscous liquid discharged in thread, strand or column form and said viscous liquid encircled by water is then processed into microparticulate form (pulverized) by the colloid mill.

In an even more advantageous development of the aforesaid organization, the water is discharged and descends as a film which encircles the circumference or periphery of the viscous liquid discharged in thread or strand form. Furthermore, it is also advantageous for the water to contain surfactant.

In addition, the apparatus for the preparation of viscous liquid water-based dispersions according to the present invention characteristically comprises a colloid mill with an inlet and a rotor, said apparatus further comprising a distributor which has a discharge base or mouth which is equipped with a discharge orifice for water and a plural number of small orifices for the thread-form or strand-form discharge of the viscous liquid, the distributor having a first distribution means for receiving and forcibly discharging a viscous liquid through a plurality of substantially uniform small orifices to form threads, strands or columns, and a second distribution means for receiving and forcibly passing water to contact said threads, strands, or columns, in the form of a water film circumferentially around said threads, strands or columns during their descent into the inlet of the colloid mill which is in vertical alignment with the bottom of said discharge base of the distributor in a position such that the threads, strands or columns in contact with the water descend into the rotor of the colloid mill wherein the bottom of said discharge base of this distributor is connected to a colloid mill.

Any viscous liquid may be used in the present invention which has a viscous fluidity in the liquid form. Particularly preferred in this regard are silicone polymers, for example, organopolysiloxanes such as, among others, dimethylpolysiloxanes, dimethylsiloxane-methylvinylsiloxane copolymers, and dimethylsiloxane-methylhydrogensiloxane copolymers; as well as organic resin prepolymers such as styrene prepolymers, methyl methacrylate prepolymers, and the like.

No specific restriction is placed in the present invention on the viscosity which such a viscous liquid may have. However, the range of 2 to 5,000 centistokes (25 degrees Centigrade) is advantageous in terms of a particularly superior development of the effects of the present invention.

The colloid mill used by the present invention may be any of those devices in the art designed for the mechanical grinding and pulverization of solid substances (refer to the "Chemical Dictionary" [in Japanese], Kyoritsu Shuppan Kabushiki Kaisha, published Sept. 10, 1967, pages 740 to 741). With regard to their organization, these colloid mills typically have a narrow gap, on the order of 0.025 mm, situated between a stator and rotor: the viscous liquid is passed through this gap together with water while the rotor is turned at 1,000 to 20,000 rpm, and pulverization and attrition are accomplished by the resulting centrifugal and shear forces.

Considering the feed according to the present invention of the viscous liquid together with water into such a colloid mill, the viscous liquid is forced through a plural number of small orifices or holes in order to form a plural number of threads, strands, or columns. This conversion into a plural number of threads or strands or columns serves to promote pulverization even further during attrition and grinding in the colloid mill and functions to give pulverized particles with uniform diameters. In other words, a condition of uniform pulverization or attrition is achieved even without the supplementary use as in the prior art of a power device such as an homogenizer.

With regard to the fine holes or orifices for conversion into thread or strand form as discussed above, the plural number of orifices will have the same orifice diameters, and this orifice diameter preferably falls within the range of 0.1 to 10 mm.

Water must be supplied at the same time that the viscous liquid is supplied to the colloid mill. This water preferably takes the form of a falling film, and it will be advantageous for this water film to encircle the circumference or periphery of the descending threads or strands of the viscous liquid. This feed configuration serves to prevent adhesion of the threads or strands of the viscous liquid, and thus results in a pulverization processing in the colloid mill in a mutually isolated and separated state. The final result is an even better particle uniformity.

With regard to the mixing ratio between the viscous liquid and water at the time of colloid mill processing, values within the range of 1/99 to 70/30 (volumetric ratio) are preferred.

Furthermore, while it is essential that water be supplied to the colloid mill together with the viscous liquid, it may also be advantageous to add a surfactant to the water in order to prepare even finer uniform dispersions. Not only does the surfactant support and promote pulverization itself as well as homogenization of the particle size, it also functions to prevent aggregation and collapse of the particles after preparation of the water-based dispersion.

Any surfactant well-known to the art may be used here, for example, anionic emulsifying agents, nonionic emulsifying agents, and cationic emulsifying agents. Anionic emulsifying agents are exemplified by higher fatty acid salts, the salts of the sulfate esters of higher alcohols, alkylnaphthalenesulfonate salts, alkylphosphonates, the salts of the sulfate esters of polyethylene glycols, etc. The nonionic emulsifying agents are exemplified by polyoxyethylene alkylphenyl ethers, sorbitan fatty acid esters, polyoxyalkylene fatty acid esters, polyoxyethylene-polyoxypropylenes, fatty acid monoglycerides, etc. The cationic emulsifying agents are exemplified by the amine salts of fatty acids, quaternary ammonium salts, alkylgyridinium salts, etc. These emulsifying agents are not necessarily used singly in the present invention, and two or more species may be used in combination.

The present invention is explained in greater detail in the following with reference to the execution examples given in the drawings.

Figure 2:
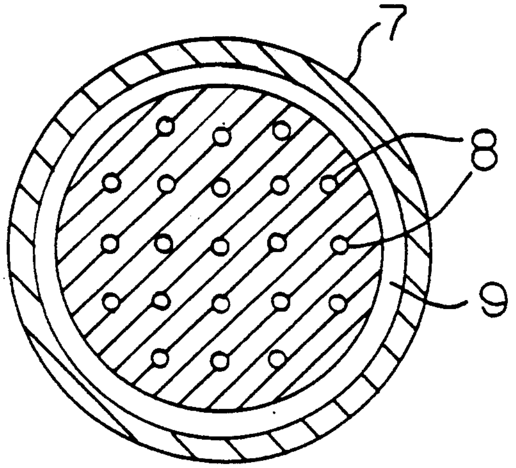
FIG. 2 is a cross section at II—II in FIG. 1.

FIGS. 1 and 2 give one example of an apparatus for the implementation of the present invention. Here, 1 is the distributor, and 2 is a colloid mill, which is connected to and communicates with the base or mouth of this distributor 1

At its top, distributor 1 has a viscous liquid distribution chamber 4, which is connected to a viscous liquid V feed line 3, and a water distribution chamber 6, which is connected to a water W feed line 5. At its bottom it has a discharge base or mouth 7. P1 is a gear pump for the pressure delivery of viscous liquid V, and P2 is a pump for the pressure delivery of water W. The central region of discharge base 7 presents a plural number of small orifices or holes 8, with the same diameter: these penetrate all the way from the viscous liquid distribution chamber 4 to the surface of the lower end of the discharge base. Also present is a circular slit 9, which encircles the circumference of the plural number of small orifices 8, and which also penetrates all the way to the lower end surface from the aforementioned water distribution chamber 6.

Figure 3:
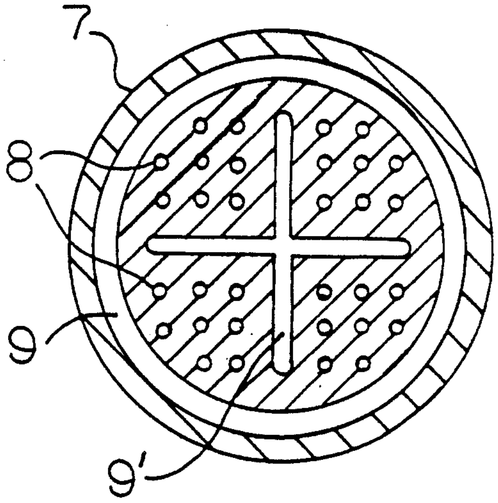
FIGS. 3 and 4 are cross sections, corresponding to FIG. 2, of devices which in each case are examples of other implementations.
Figure 4:
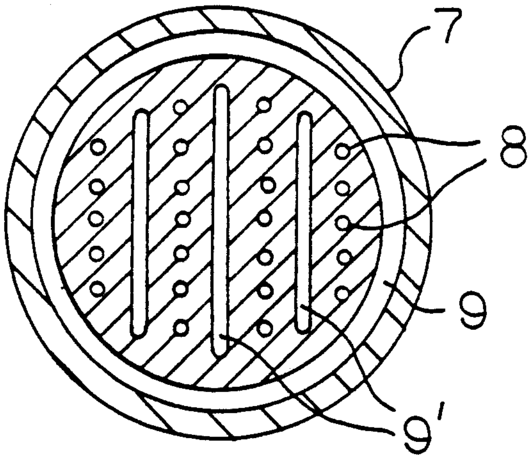

The viscous liquid V is discharged as threads or strands or columns from these fine holes 8, whose diameters preferably fall within the range of 0.1 to 10.0 mm as discussed above. A film of water W is discharged from slit 9, whose width also preferably falls within the range of 0.1 to 10.0 mm. The slit 9 for the film-form discharge of water is not limited merely to a circumferential execution, and water W is also advantageously discharged in film-form from slits 9' which are set up as auxiliary slits 9' which cross among the plural number of small holes 8. Examples of such executions are given in FIGS. 3 and 4.

On the other hand, the colloid mill 2 contains an internal rotor 10, as well as a stator 11*a*, 11*b* situated above and below so as to encircle the rotor's exterior. The rotor 10 is installed on a vertical rotating axle 12, and, receiving power from a drive source (not shown in the figure), can be rotated at 1,000 to 20,000 rpm. The clearance between the rotor 10 and the stator 11*a*, 11*b* forms a narrow gap in the range of 0.020 to 0.100 mm, which sets up a fine slot along their opposing surfaces. The top of the stator 11*a* is equipped with a feed opening 13 for the viscous liquid threads or strands, etc. The bottom of the stator 11*b* is equipped with an outlet 14 for discharge of the viscous liquid water-based dispersion after pulverization.

To prepare a viscous liquid water-based dispersion using the apparatus described above, the viscous liquid V is discharged as threads or strands from the fine holes 8, in discharge base 7, and it descends toward the bottom into the inlet 13 of colloid mill 2 while its periphery or circumference is encircled by water W (containing surfactant as desired) discharged in film-form from slit 9. The thread-form or strand-form viscous liquid V is pulverized and reduced together with the water W in the gap between the rotor 10 and stator 11*a*, 11*b*, thus forming a water-based dispersion of a viscous liquid which has been pulverized into spherical particles of uniform size.

EXAMPLE 1

A silicone polymer and water were processed as described below using an apparatus as described in FIGS. 1 and 2 (colloid mill clearance set at 0.075 mm, slit width = 1.0 mm, fine hole diameter = 0.5 mm). Thus, silicone polymer (dimethylpolysiloxane with a viscosity at 25 degrees Centigrade of 500 centistokes) and water were each discharged in the same quantity (20,000 cc/hr, 1:1 ratio), the former as a plural number of threads, the latter as a film encasing the circumference of the former, down into the colloid mill for pulverization.

The silicone polymer water-based dispersion thus obtained was a uniform dispersion in water: the dimethylpolysiloxane in the liquid comprised spherical particles with an average diameter of 100 microns, which were all uniform in size.

EXAMPLE 2

A mixture A was prepared by combining and mixing the following: 100 parts dimethylvinylsiloxy-terminated dimethylpolysiloxane with a viscosity of 500 centistokes (25 degrees Centigrade) and a vinyl group content of 0.5 weight %, and 6 parts trimethylsiloxy-terminated methylhydrogenpolysiloxane with a viscosity of 10 centistokes (25 degrees Centigrade) and a silicon-bonded hydrogen atom content of 1.5 weight %.

A mixture B was prepared by combining and mixing 100 parts dimethylpolysiloxane as described above and 0.6 parts isopropanolic chloroplatinic acid solution (platinum content=3 weight %).

Mixtures A and B were each placed in separate liquid silicone rubber composition tanks, and the tanks were cooled to minus 10 degrees Centigrade. Then, 250 parts mixture A and 250 parts mixture B were mixed by passage through a Static Mixer (static-type mixer) which had been preliminarily cooled to plus 5 degrees Centigrade. A water-based dispersion of pulverized, finely divided silicone rubber was prepared by directly processing this silicone rubber mixture (500 parts) and water (500 parts) at a 1:1 ratio in the apparatus described in Example 1. In addition, this water-based dispersion was discharged into hot water (70 degrees Centigrade) in order to cure the microparticulate silicone rubber.

The silicone rubber particles in the obtained dispersion were spheres with average diameters of 15 microns which were all uniform in size and were uniformly dispersed in the water.

EFFECTS OF THE INVENTION

In the preparative method and apparatus of the present invention as described above, because the viscous liquid is fed as a plural number of threads or strands into the colloid mill along with water, pulverization or size reduction of the viscous liquid in the dispersion is achieved together with an improvement in particle uniformity. Thus, the implementation of a supplementary treatment using a power device, such as an homogenizer, and the like, becomes unnecessary, Which makes possible an improvement in productivity and a reduction in cost.

What is claimed is:

1. A method for the preparation of a water-based dispersion of a viscous liquid, said method consisting of steps in which, along with water, the viscous liquid, having a viscosity within the range of 2 to 5000 centistokes at 25° C. is supplied to a colloid mill by forced discharge and down flow in the form of a plural number of threads, strands, or columns from a plural number of small holes or orifices, said water is forcibly discharged as a film which flows down in such a manner that it encircles the circumference of the viscous liquid discharged in thread, strand or column form and said viscous liquid, encircled by water, is then processed into microparticulate form by the colloid mill.

2. The method for the preparation of a water-based dispersion of a viscous liquid according to claim 1 in which the water contains a surfactant.

3. The method of claim 1 wherein the volume mixing ratio between the viscous liquid and water is from 1/99 to 70/30.

4. The method of claim 1 wherein the holes or orifices have about the same diameter.

5. The method of claim 1 wherein the viscous liquid is a silicone polymer.

6. An apparatus for the preparation of a water-based dispersion of a viscous liquid, said apparatus comprising a colloid mill with an inlet and a rotor, said apparatus further comprising a distributor which has a discharge base which is equipped with a discharge orifice for water and a plural number of small orifices for the thread-form, column-form, or strand-form discharge of the viscous liquid, the distributor having a first distribution means for receiving and forcibly discharging a viscous liquid through a plurality of uniform small orifices to form threads, strands or columns, and a second distribution means for receiving and forcibly passing water to contact said threads, strands, or columns, in the form of a water film circumferentially around said threads, strands or columns during their descent into the inlet of the colloid mill which is in vertical alignment with the bottom of said discharge base of the distributor in a position such that the threads, strands or columns in contact with the water descend into the rotor of the colloid mill.

* * * * *